US011658406B2

(12) United States Patent
Lavin et al.

(10) Patent No.: US 11,658,406 B2
(45) Date of Patent: May 23, 2023

(54) TAPERED WALL RADOME

(71) Applicant: The Boeing Company, Chicago, IL (US)

(72) Inventors: Ronald O. Lavin, Gilbert, AZ (US); Michael M. LoRe, Mesa, AZ (US); Andy H. Lee, Phoenix, AZ (US); Michael B. Carr, Mesa, AZ (US)

(73) Assignee: The Boeing Company, Chicago, IL (US)

( * ) Notice: Subject to any disclaimer, the term of this patent is extended or adjusted under 35 U.S.C. 154(b) by 594 days.

(21) Appl. No.: 16/444,520

(22) Filed: Jun. 18, 2019

(65) Prior Publication Data

US 2020/0403302 A1 Dec. 24, 2020

(51) Int. Cl.
*H01Q 1/42* (2006.01)
*G01S 3/04* (2006.01)
*G01S 3/48* (2006.01)
*H01Q 21/24* (2006.01)
*H01Q 1/28* (2006.01)

(52) U.S. Cl.
CPC ............ *H01Q 1/421* (2013.01); *G01S 3/043* (2013.01); *G01S 3/48* (2013.01); *H01Q 21/24* (2013.01); *H01Q 1/28* (2013.01)

(58) Field of Classification Search
CPC .......... H01Q 1/421; H01Q 21/24; H01Q 1/28; G01S 3/43; G01S 3/48
USPC ................................... 342/442, 368, 705, 27
See application file for complete search history.

(56) References Cited

U.S. PATENT DOCUMENTS

| 10,098,018 | B2* | 10/2018 | Lysejko | ............... H01Q 25/002 |
| 2008/0074338 | A1* | 3/2008 | Vacanti | .................. H01Q 21/28 343/705 |
| 2010/0039346 | A1* | 2/2010 | Peter | ..................... H01Q 1/421 342/368 |
| 2011/0248902 | A1 | 10/2011 | Miyagawa et al. | |
| 2016/0047909 | A1* | 2/2016 | Pu | ........................... G01S 13/48 342/27 |
| 2017/0352950 | A1 | 12/2017 | Sakurai et al. | |

OTHER PUBLICATIONS

Extended European Search Report prepared by the European Patent Office in application No. EP 20 17 4585.8 dated Sep. 22, 2020.

* cited by examiner

*Primary Examiner* — Bo Fan
(74) *Attorney, Agent, or Firm* — McDonnell Boehnen Hulbert & Berghoff LLP

(57) ABSTRACT

In examples, systems and methods for direction finding of electromagnetic signals are described. The device includes a first antenna configured to receive electromagnetic energy. The device also includes a second antenna configured to separately receive the same electromagnetic energy. The device further includes a radome located in a receiving pathway of the first antenna, where the radome is configured to cause a predetermined phase shift that varies based on an angular position of the receiving pathway. The device includes 1 or more radio receivers to receive the signals independently from the antennas. Additionally, the direction finding device includes a processor configured to determine an angle of arrival of the electromagnetic energy based on a comparison of a phase of the electromagnetic energy received by the first antenna to a phase of the electromagnetic energy received by the second antenna.

20 Claims, 6 Drawing Sheets

TAPERED WALL RADOME

FIELD

Embodiments of the present disclosure relate generally to antenna radomes. More particularly, embodiments of the present disclosure relate to antenna radome structures for use in a direction-of-arrival system.

BACKGROUND

Electromagnetic waves are commonly used for long range communication and direction finding, in such applications as communication by mobile phones and in radar systems. In some instances, it may be desirable for a radio system to measure an angle of arrival to determine a direction from which electromagnetic waves are propagating. Conventional direction-of-arrival systems use an antenna array to receive incoming electromagnetic waves and determine the direction of arrival based on a phase difference of the received signal between the various antenna elements. On aircraft, many direction finding systems utilize antennas mounted on quadrants of the airframe, such as radar warning systems used on military aircraft.

The antenna array may include a radome. A radome is structure that is designed to physically protect the antennas. The radome is usually designed to be nearly lossless to electromagnetic energy at the frequencies of operation of the antenna array.

SUMMARY

In one example, a direction-finding device for use in a direction-of-arrival system is described. The device includes a first antenna configured to receive electromagnetic energy. The device also includes a second antenna configured to separately receive the electromagnetic energy. The device further includes a radome located in a receiving pathway of the first antenna, where the radome is configured to cause a predetermined phase shift that varies based on an angular position of the receiving pathway. Further, the device includes a radio receiver configured to receive the signal from the first and second antennas. Additionally, the direction-finding device includes a processor configured to determine an angle of arrival of the electromagnetic energy based on a comparison of a phase of the electromagnetic energy received by the first antenna to a phase of the electromagnetic energy received by the electromagnetic receiver.

In another example, a method of determining an angle of arrival is described. The method includes receiving electromagnetic energy by a first antenna, where the electromagnetic energy passes through a radome before being received by the first antenna. Additionally, as part of the method, the radome causes a predetermined phase shift that varies based on an angular position of the received pathway. Additionally, the method includes separately receiving the electromagnetic energy by a second antenna. Yet further, the method includes determining an angle of arrival of the electromagnetic energy, by a processor, based on a comparison of a phase of the electromagnetic energy received by the first antenna and a phase of the electromagnetic energy received by the second antenna.

In another example, a direction-finding device for use in a direction-of-arrival system is described. The direction-finding device includes a first bi-conical antenna configured to receive electromagnetic energy. The direction-finding device also includes a second bi-conical antenna configured to separately receive electromagnetic energy. The second bi-conical antenna has the same geometry as the first bi-conical antenna, both one-half wavelength in height at the frequency of operation, with conical angle of 0 to 90 degrees depending on desired bandwidth of operation. Additionally, a phase center of the first bi-conical antenna is located one-half of a wavelength of a frequency of operation from a phase center of the second bi-conical antenna. The direction-finding device also includes a radome located in a receiving pathway of the first bi-conical antenna, where the radome is configured to cause a predetermined phase shift that varies based on an angular position of the receiving pathway. Yet further, the direction-finding device includes a processor configured to determine an angle of arrival of the electromagnetic energy based on a comparison of a phase of the electromagnetic energy received by the first bi-conical antenna and a phase of the electromagnetic energy received by the second bi-conical antenna.

The features, functions, and advantages that have been discussed can be achieved independently in various embodiments or may be combined in yet other embodiments further details of which can be seen with reference to the following description and drawings.

BRIEF DESCRIPTION OF THE FIGURES

Example novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings, wherein:

DETAILED DESCRIPTION

Figure 1:
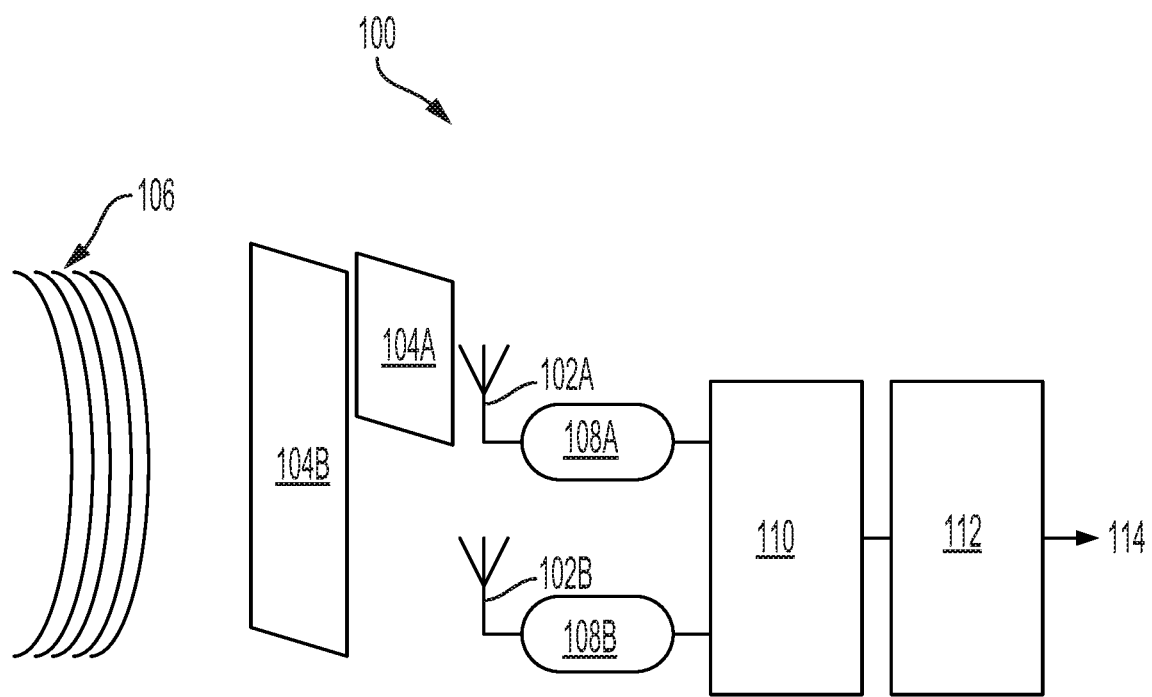
FIG. 1 illustrates a block diagram, according to an example embodiment.

Disclosed embodiments will now be described more fully hereinafter with reference to the accompanying drawings, in which some, but not all of the disclosed embodiments are shown. Indeed, several different embodiments may be described and should not be construed as limited to the embodiments set forth herein. Rather, these embodiments are described so that this disclosure will be thorough and complete and will fully convey the scope of the disclosure to those skilled in the art.

The present system may be used for determining the angle of arrival of incoming electromagnetic (e.g., radio) waves. Unlike conventional direction-finding systems, such as radar warning systems used on military aircraft, the present disclosure is directed toward a direction-finding system that is compact and provides a high degree of direction-finding accuracy.

Rather than relying on an antenna array or antennas mounted far apart as with conventional systems for determining the angle of arrival of incoming signals, the present disclosure uses closely-located two antennas, one of which is covered with a specially-designed radome. The radome of the present disclosure induces angular-based phase and/or amplitude distortions in received signals. Thus, by comparing the received signals from the two antennas, the system may determine the angle of arrival based on signal distortions caused by the radome in the signals received by the second antenna. Due to the radome-induced distortions, and through selection of appropriate antennas, the two antennas may be placed relatively close to each other to minimize phase measurement error. In conventional directional of arrival systems, a larger spacing between antennas (or multiple antennas in an array) may be needed to determine phase differences between received signals.

In some examples, the radome may introduce phase and/or amplitude distortions through changes in the material of the radome wall that cause a permittivity to vary based on a look-angle through the radome. In another example, the radome may introduce phase and/or amplitude distortions through the radome having a tapered wall thickness. In yet another example, the radome may introduce phase and/or amplitude distortions through the radome having a printed pattern on the radome that causes an effective change in permittivity based on a position on the radome.

In still another example, the radome may be attached or coupled to a motor, actuator, or other devices that causes a movement of the radome. The movement of the radome may cause a time-varying change in the angular permittivity of the radome aids or improves accuracy of direction of arrival calculations.

In a practical application, the present direction-of-arrival system may be mounted on an aircraft at a location with 360-degree field of view, such as the lower fuselage or vertical tail tip. It may also be mounted on a building, tower, space vehicle, maritime vehicle, or ground vehicle. The direction-of-arrival system may be able to determine the angular location of incoming electromagnetic energy. In some examples, the incoming electromagnetic energy may be or include radar radio signals from another aircraft, spacecraft, maritime craft, or ground. Thus, the present direction-of-arrival system may aid in determining a direction to another aircraft.

In another practical application, the present direction-of-arrival system may be mounted on a vehicle, mobile device, or other structure at a location with field of view toward the sky. The direction-of-arrival system may be able to determine the angular location of incoming electromagnetic energy. In some examples, the incoming electromagnetic energy may be or include signals from satellites used for global positioning. Thus, the present direction-of-arrival system may aid in determining that the signal is arriving from its expected direction and not from a false source.

Referring now to the figures, FIG. 1 illustrates an example of a direction-finding system 100 including two antennas, a first antenna 102A and a second antenna 102B. The first antenna 102A may have a radome 104A that is mounted in a direction from which incoming electromagnetic energy 106 may be received. Both the first antenna 102A and the second antenna 102B may be configured to separately receive incoming electromagnetic energy 106. The second antenna 102B is used as a phase reference by which to compare signals received by antenna 102A.

In most examples, the first antenna 102A and the second antenna 102B may be antennas with the same geometry. Examples include half wavelength dipole or biconical antennas, patch antennas, quarter wavelength monopole or conical antennas, aperture antennas such as horns and dishes, coaxial collinear antennas, and any other antenna geometry. It may be desirable for both antennas to have the same gain and phase performance over the desired field of view, and this is most conveniently provided by using a pair of identical antennas. In some cases, it may be desirable for both the first antenna 102A and the second antenna 102B to be half wavelength dipoles or bi-conical antennas, since these antennas have an omnidirectional radiation pattern with good gain over a wide range of elevation angles (approximately 80 degrees for a dipole), and a wide bandwidth, and therefore may be used for direction of arrival in all azimuthal directions over a range of useful elevation angles about the horizon. The half wavelength dipole and bi-conical antenna have the additional advantage of being able to be placed close together in tandem, such that each resides in the other's cone of silence (i.e., a region from which the antenna does not receive signals), thereby reducing coupling interference and improving the phase detection accuracy through eliminating path length differences for impinging electromagnetic waves. In the case of a pair of bi-conical or dipoles in tandem, the antennas may be spaced one quarter of a wavelength apart, as calculated from feed point of each antenna at the center frequency of operation.

Further, the first antenna 102A and the second antenna 102B may be quarter wavelength monopole or conical antennas, as such antennas have good omnidirectional coverage over a wide range of angles in a single hemisphere above or below the plane of the antenna. The disadvantage of using ground plane antennas of the monopole family is that when closely spaced, the monopoles will exhibit higher coupling, contributing to measurement uncertainty, and they are difficult to co-locate since they do not have a cone of silence as with dipole antennas. In some cases, for space or high altitude operations such as GPS, it may be advantageous to use ground plane dependent antennas for antenna 102A and antenna 102B, or choose antennas with hemispheric patterns such as spiral or turnstile antennas, and place them side-by-side one half wavelength apart, to provide a direction finding capability over the entire hemisphere.

In some other examples, the first antenna 102A and the second antenna 102B may be different kinds of antennas. For example, the first antenna 102A may be conical antenna and the second antenna 102B may be a simple monopole, other antenna element, or a more generic electromagnetic receiver.

Based on the desired use case, the frequencies over which the first antenna 102A and the second antenna 102B may vary. As one example, the first antenna 102A and the second antenna 102B may be configured to receive signals having frequencies between 8 gigahertz (GHz) and 12 GHz. In other examples, different frequency bands may be used as well, depending on the types of radio waves the system is designed to receive.

The radome 104A may be located and shaped in a receiving pathway of the first antenna 102A where all (or a majority of) incoming electromagnetic energy 106 passes through the radome before being received by the first antenna 102A. In examples where the first antenna 102A is bi-conical or dipole antenna, the radome may have a hollow cylindrical shape within which the first antenna 102A is located. In other examples, the radome 104A may have a flat shape that covers the first antenna 102A. Additionally, in other examples, the radome 104A may have a domed shape that covers the first antenna 102A. Other shapes are possible for the radome 104A as well.

In some examples, the direction-finding system 100 may include two radomes, radome 104A and a second radome 104B, the second radome 104B covering both the first antenna 102A and the second antenna 102B. In this example, the second radome 104B may be located in a receiving pathway of both the first antenna 102A and the second antenna 102B where all (or a majority of) incoming electromagnetic energy 106 passes through the second radome 104B before being received by the first antenna 102A and the second antenna 102B. Additionally in this example, the second radome 104B may be designed to not introduce any distortions in the incoming electromagnetic energy 106. Therefore, the second antenna 102B may receive incoming electromagnetic energy 106 that has passed through the second radome 104B and the first antenna 102A may receive incoming electromagnetic energy 106 that has passed through the second radome 104B and the radome 104A.

As previously discussed, the radome 104A may introduce phase and/or amplitude distortions through various different structural and material properties of the radome 104A, including having changes in the material of the radome that cause a permittivity of the radome 104A to vary based on a position on the radome 104A, the radome 104A having a tapered width, or the radome 104A having a printed pattern on the radome 104A that causes an effective change in permittivity based on a position on the radome. In various other examples, the radome 104A may introduce distortions based on other structural and material properties as well.

The first antenna 102A and the second antenna 102B may be coupled to a first receiver front end 108A and a second receiver front end 108B, respectively. The first receiver front end 108A and the second receiver front end 108B may be configured to down convert signals received by the respective antennas. For example, the first antenna 102A and the second antenna 102B may be configured to receive signals having frequencies between 8 GHz and 12 GHz and the respective receiver front ends may down-convert the received signals to a lower frequency and/or baseband for further processing. Although the first receiver front end 108A and the second receiver front end 108B are shown as two different components, in some examples, they be integrated together as a single component, possibly with other components integrated as well (such as a signal processor 110 and/or an angle of arrival processor 112).

The signal processor 110 may be configured to determine a phase difference, an amplitude difference, and/or perform a Fast Fourier Transform (FFT) on the down converted or baseband signals from the respective receiver front ends, the first receiver front end 108A and the second receiver front end 108B. In some systems, signal processor 110 may include processing to determine not only angle of arrival of the signal, but direction and speed of the source of the signal, through Doppler frequency shift analysis of the FFT-transformed time domain signal.

The output of the signal processor 110 may be fed into an angle of arrival processor 112. The angle of arrival processor 112 may be configured to receive the output of the signal processor 110 and generate an angle of arrival estimate output 114. The angle of arrival estimate output 114 may be used by other systems. For example, an alert system may alert a pilot of the angle of arrival estimate output 114, so the pilot knows the direction from which incoming electromagnetic signals are coming.

In some examples, the angle of arrival processor 112 may be able to read data from a data storage device (not shown). The data storage device may include information about the angular distortions caused by the radome 104A. The processor may use this data and perform a correlation on the received signals from the first antenna 102A and the second antenna 102B to determine the angle at which the incoming electromagnetic energy 106 was received by the first antenna 102A. More specifically, in some examples, the angle of arrival processor 112 may use data about the signal received by the second antenna 102B as a reference signal. The angle of arrival processor 112 may compare a relative phase difference between the signal received by the first antenna 102A and the signal received by the second antenna 102B. The angle of arrival processor 112 may responsively use this relative phase information, combined with the data in the data storage device to determine the angle of arrival.

In another example, rather than using relative phase information, the angle of arrival processor 112 may use relative amplitude information. In this instance, rather than causing a phase distortion, the radome may be configured to provide an amplitude distortion based on the angle of arrival. In some further examples, the radome may provide both phase and amplitude distortions and the angle of arrival processor 112 may use both phase and amplitude information from the first antenna 102A and the second antenna 102B to determine the angle of arrival.

In some examples, both the functionality of the signal processor 110 and the angle of arrival processor 112 may be performed by the same general purpose computing processor executing instructions to perform the given functions. In other examples, the signal processor 110 and the angle of arrival processor 112 may be separate processors. For example, both the signal processor 110 and the angle of arrival processor 112 may be custom processors, such as application-specific integrated circuit (ASIC) processors.

Figure 2:
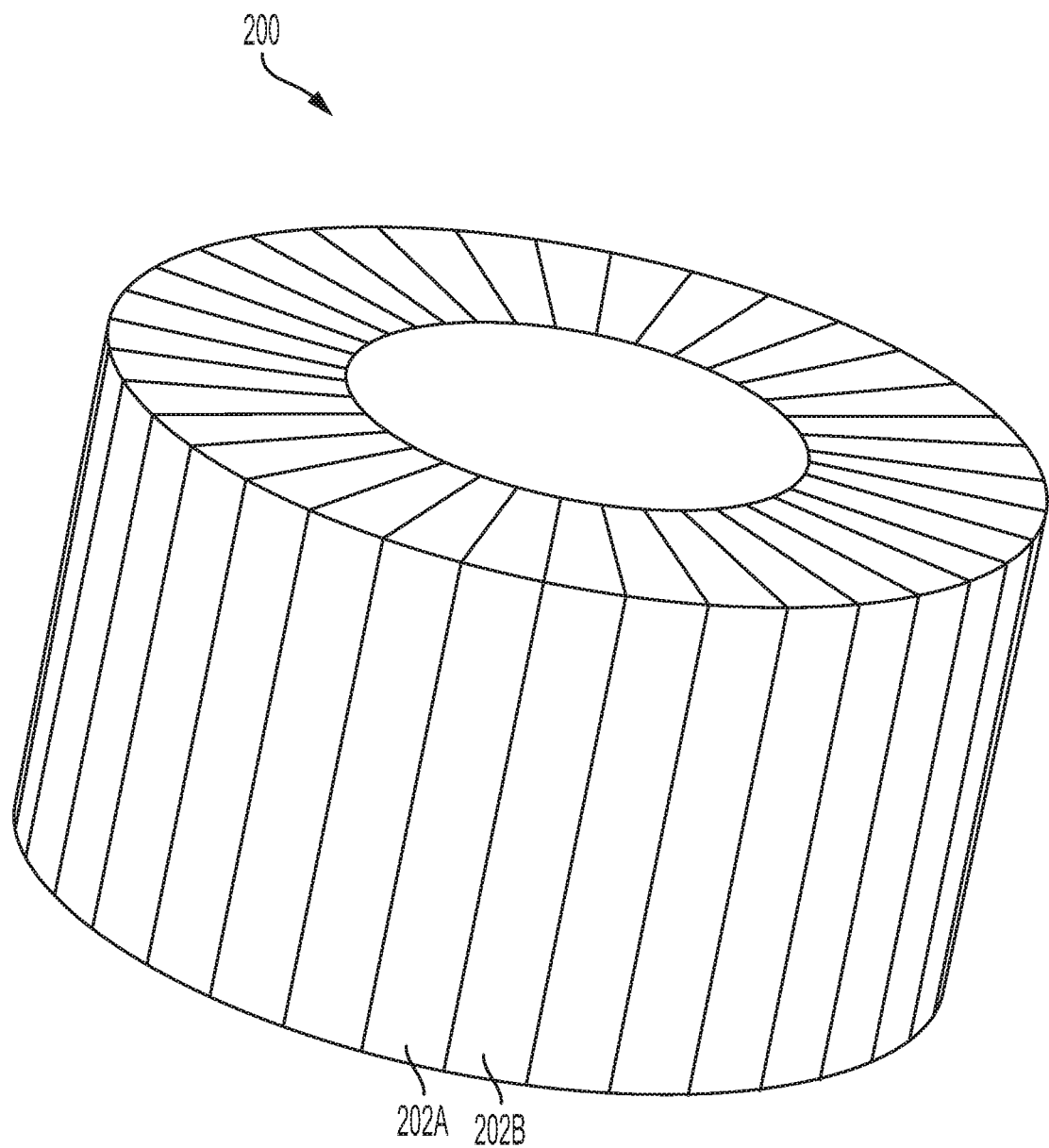
FIG. 2 illustrates an example radome, according to an example embodiment.

FIG. 2 illustrates an example of a radome 200, according to an example embodiment. The radome 200 may be configured to provide phase and/or amplitude distortions at various angles. As shown in FIG. 2, the radome may be a hollow cylindrical shape. The hollow center section may have a diameter that is wide enough for an antenna (such as the first antenna 102A of FIG. 1) to be placed inside of the radome 200. While radome 200 has a hollow cylindrical shape, it may also take other shapes, depending on different applications.

As shown in FIG. 2, radome 200 includes 36 different segments, indicated by the first representative segment 202A and the second representative segment 202B. Because a full cylinder is 360 degrees, each of the 36 segments of radome 200 may make up 10 degrees of the radome 200. Each segment may be made of a material that has a different permittivity than that of each other segment. In some examples, the permittivity of the radome may vary from approximately 1 to about 4.5. The permittivity may distort the phase and/or amplitude of electromagnetic energy that passes through the radome. The upper and lower extrema of dielectric permittivities desired is determined by the designer based on the angular resolution desired around the radome and the desired phase differences for each increment, which is dependent upon the ability of the radio receiver and signal processor to accurately measure phase differences. Common materials which can be engineered for acceptable ranges of permittivity using established practices include various syntactic foams, nylon powders, fiberglass laminates, or sandwich structures with engineered dielectric core such as honeycomb, open or closed cell foams, pin pultruded foams, or other sandwich types, and face sheets which may include fiberglass, Astroquartz, or other pre-pregs.

Although radome 200 has 36 segments, more or fewer segments may be used as well, depending on the angle of arrival resolution desired. Additionally, in some examples, each segment may not have the same angular width as each other segment. For example, segments may be narrow in regions where a more precise angle of arrival calculation may be desirable. In some other examples, the number of segments may be constrained by manufacturing tolerances, such as engineered permittivity material manufacturing. Additionally, the number of segments may be constrained based on experimental testing of various radomes. It may be desirable to use wider segments based on a reliability of the angle of arrival measurement.

In some further examples, segmented radomes may be made in other shapes as well, such as a flat radome, a domed radome, spherical radome, conical radome, or other shape, and have the same functionality as described here.

Figure 3:
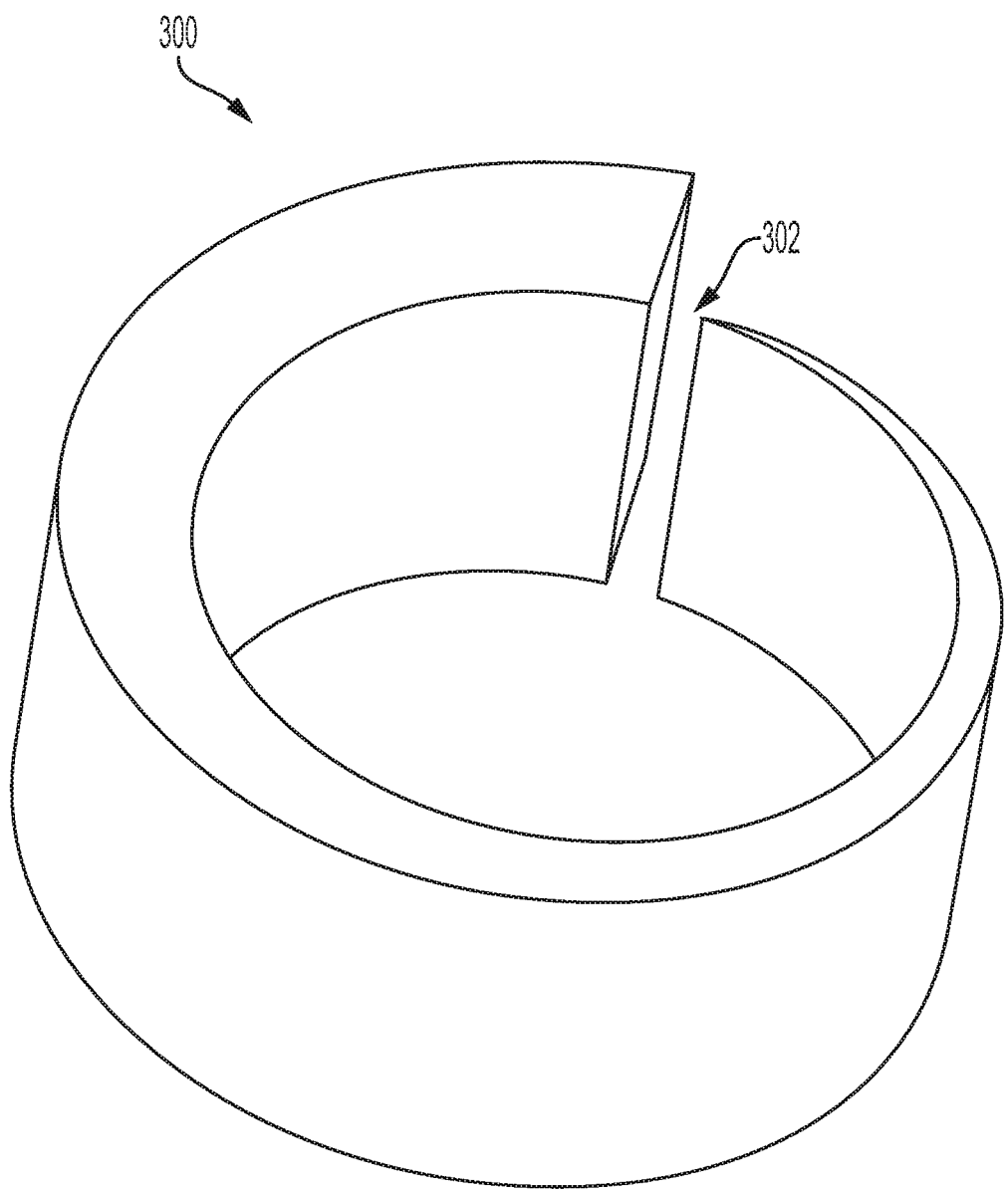
FIG. 3 illustrates another example radome, according to an example embodiment.

FIG. 3 illustrates another example of a radome 300, according to an example embodiment. The radome 300 may be configured to provide phase and/or amplitude distortions at various angles. As shown in FIG. 3, the radome may be a hollow cylindrical shape with a tapered wall thickness. The hollow center section may have a diameter that is wide enough for an antenna (such as the first antenna 102A of FIG. 1) to be placed inside of the radome 300. While radome 300 has a hollow cylindrical shape, it may also take other shapes, depending on different applications.

As shown in FIG. 3, radome 300 includes a tapered shape. The tapered shape causes the radome 300 to have a wall thickness that varies based on the angle. The tapered shape results from a gradual narrowing of the thickness of the radome 300 wall along a spiral of the radome 300, for example. The material that forms radome 300 may have a constant dielectric permittivity throughout the material. In some examples, the dielectric permittivity of the radome wall may range from approximately 1 to about 4.5, but can have any range of permittivities allowed by manufacturing methods and desired for the application The dielectric may distort the phase and/or amplitude of electromagnetic energy that passes through the radome. The amount of distortion introduced to incoming electromagnetic energy by the radome may be proportional to the thickness of the radome that the electromagnetic energy passes through. Therefore, a thicker portion may introduce larger distortions than thinner portions.

In some examples, as shown in FIG. 3, the radome 300 may include a gap 302. The gap 302 is an angular region that is not covered by the radome, and is equivalent to a relative dielectric permittivity of 1. In some examples, gap 302 may be omitted.

Additionally, the radome 300 may take a shape that is not tapered. Rather, radome 300 may have a shape that includes a stepped pattern. Each step may have a predetermined angular width. Similar to radome 200 of FIG. 2, radome 300 include 36 different steps, each being 10 degrees wide. In various different stepped examples, more or fewer steps may be used as well. Additionally, in some examples, each step may not have the same angular width as each other segment. For example, steps may be narrow in regions where a more precise angle of arrival calculation may be desirable. In some other examples, the number of steps may be constrained by manufacturing tolerances, such as material manufacturing. Additionally, the number of steps may be constrained based on experimental testing of various radomes. It may be desirable to use wider steps based on a reliability of the angle of arrival measurement.

In some further examples, tapered (or stepped) radomes may be made in other shapes as well, such as a flat radome, a domed radome, spherical radome, conical radome, or other shape as well and have the same functionality described here.

Figure 4:
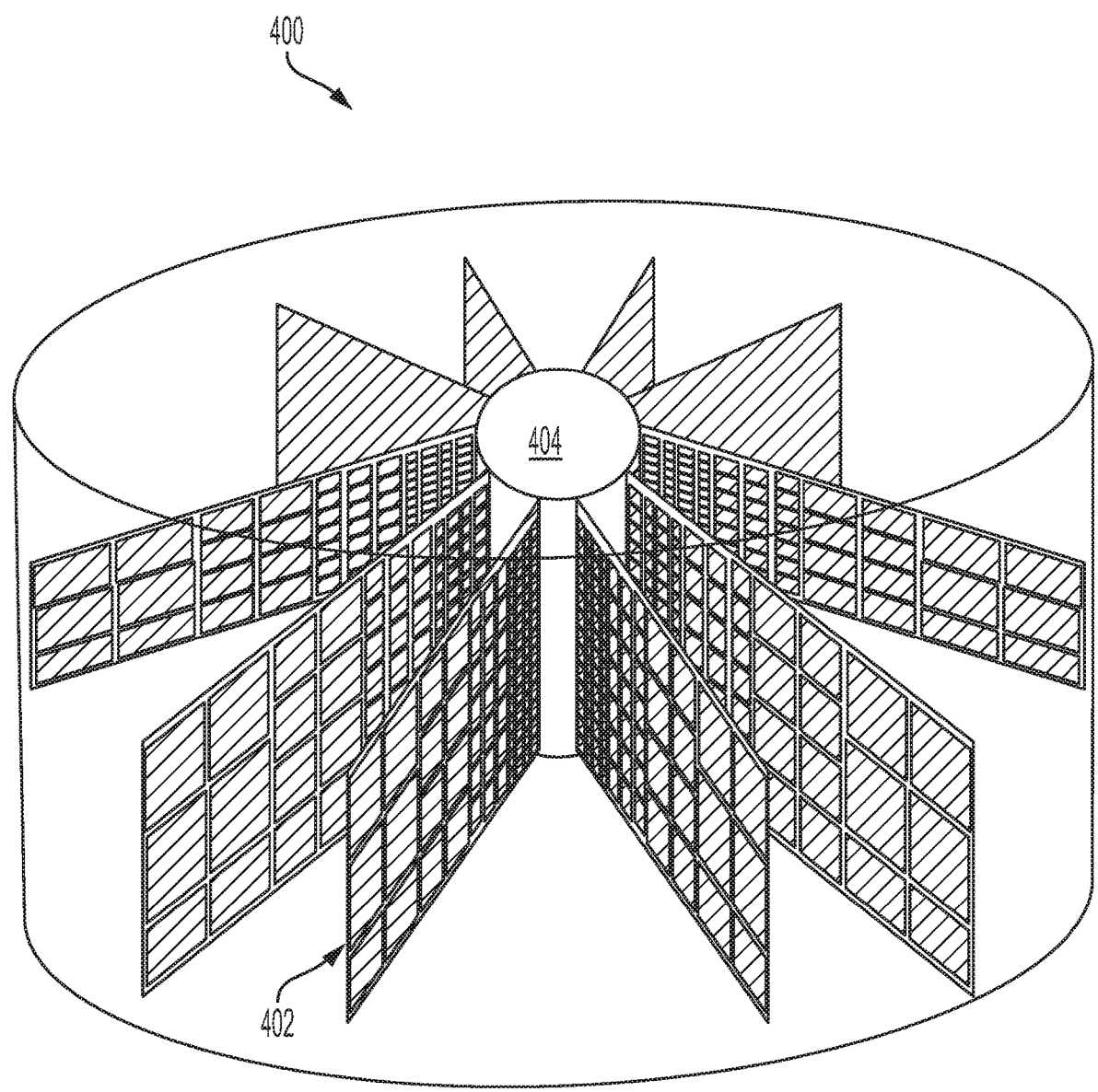
FIG. 4 illustrates another example radome, according to an example embodiment.

FIG. 4 illustrates another example of a radome 400, according to an example embodiment. The radome 400 may be configured to provide phase and/or amplitude distortions at various angles. As shown in FIG. 4, the radome 400 may be a hollow cylindrical shape that has a set of patterned surfaces 402. The hollow center section 404 may have a diameter that is wide enough for an antenna (such as the first antenna 102A of FIG. 1) to be placed inside of the radome 400. While radome 400 has a hollow cylindrical shape, it may also take other shapes, depending on different applications.

As shown in FIG. 4, radome 400 includes a set of patterned surfaces 402 upon which a geometric pattern is located. The set of patterned surfaces 402 are designed with distributed capacitance that causes the radome 400 to have a permittivity that varies based on the angle. The material that forms radome 400 may have a constant permittivity throughout the material, but the effective permittivity may change based on the angle due to the set of patterned surfaces 402. The patterned surfaces may cause a respective capacitance within each sector (i.e., angular region between two sheets), and causes each sector to have its own effective permittivity. The effective permittivity within each region may be different from each other region. In some examples, the permittivity of the material that forms the radome may approximately 1 to about 4.5. The permittivity may distort the phase and/or amplitude of electromagnetic energy that passes through the radome.

In one example, the geometric pattern on each set of patterned surfaces 402 may be made by etching copper, through additive manufacturing, or through other processes. The geometric pattern on each set of patterned surfaces 402 shown in FIG. 4 is on example pattern, but other shapes and designs may be used as well. Various different patterns may be used to produce the net frequency independent constant effective permittivity in angular section used to create for phase offsets.

In some other examples, additive manufacturing can be used to create a truss system within the radome that becomes more and more dense as the truss moves away from the center of the radome to produce the net frequency independent constant effective permittivity in each angular section used to create for phase offsets.

In some examples, the radome 400 may have a plurality of surfaces, each having a respective pattern. Each set of patterned surfaces 402 of the radome 400 may have an associated pattern that is printed with conductive, resistive, or ferrous ink, or printed on a substrate, such as polyimide film, which is adhered to the radome. The printed pattern may cause an effective change in permittivity based on a position on the radome. In other examples, an additive manufacturing process may be used to form the radome 400 and the pattern may be created by forming the pattern during the additive manufacturing process. Although radome 400 is shown with pattern 402, other patterns may be used as well. Additionally, each surface of the patterned surfaces may have a similar pattern, but the dimensions of the printing may be adjusted to provide a desired phase shift for the respective angular region.

In some examples, each set of patterned surfaces 402 may continuously vary around the circumference of the radome 400. In some other examples, each set of patterned surfaces 402 may incrementally vary around the circumference of the radome 400, for example, set of patterned surfaces 402 may be located every 10 degrees, each with a pattern that has different dimensions, to provide a different permittivity. In some other examples, the set of patterned surfaces 402 may be spaced in non-equal increments. For example, set of patterned surfaces 402 increments may be narrow in regions where a more precise angle of arrival calculation may be desirable. In some other examples, the set of patterned surfaces 402 increments may be constrained by manufacturing tolerances, such as printing or additive manufacturing tolerances, or angular spacing tolerances. Additionally, the set of patterned surfaces 402 increments may be constrained based on experimental testing of various radomes. It may be desirable to use wider increments based on a reliability of the angle of arrival measurement.

In some further examples, patterned radomes may be made in other shapes as well, such as a flat radome, a domed radome, spherical radome, conical radome, or other shape as well, and have the same functionality as described here.

Figure 5:
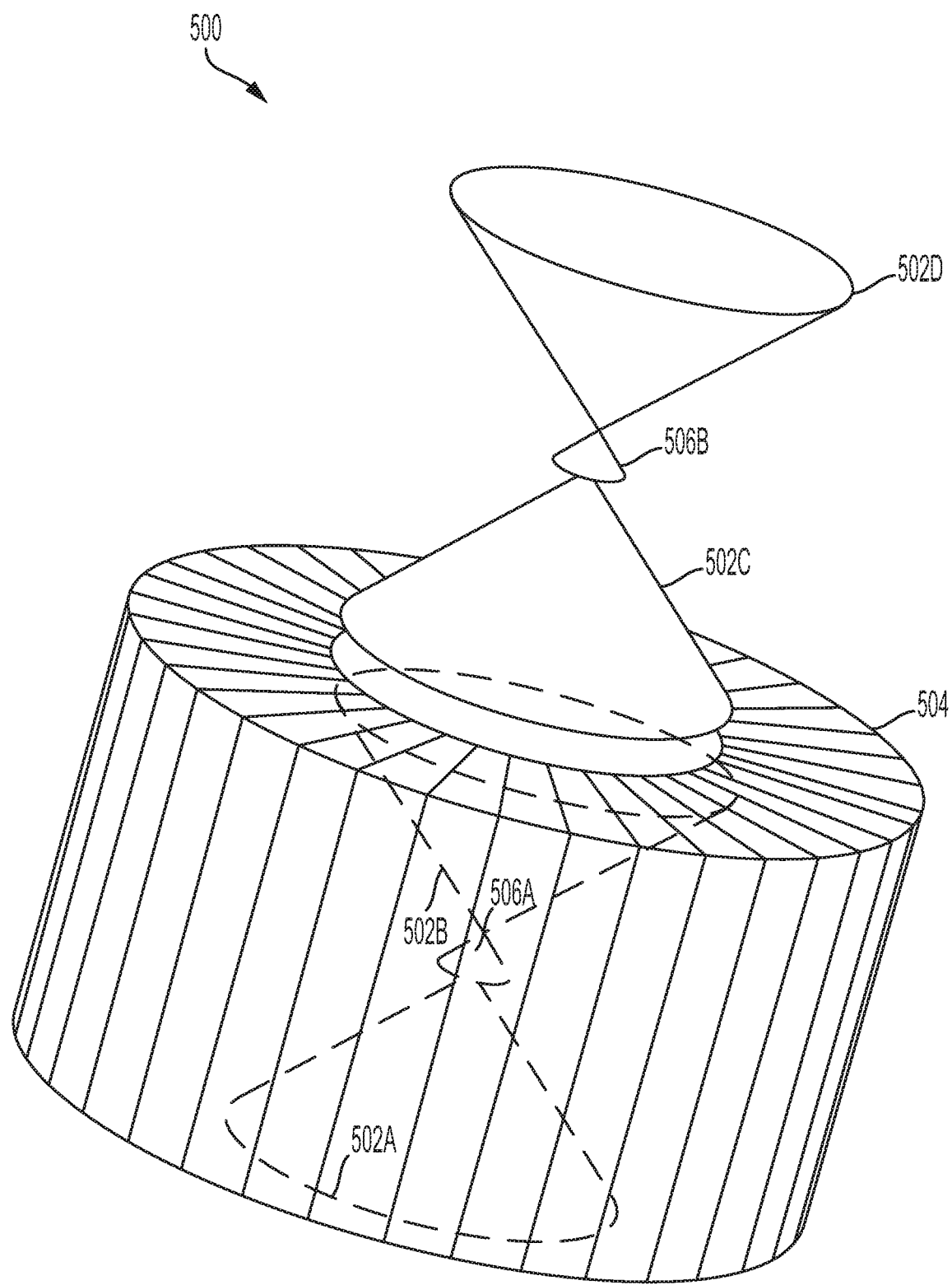
FIG. 5 illustrates an example antenna pair and radome, according to an example embodiment.

FIG. 5 illustrates an example antenna pair of bi-conical antennas. The first bi-conical antenna includes a top section 502A and a bottom section 502B and the second bi-conical antenna includes a top section 502C and a bottom section 502D. The first bi-conical antenna is located within radome 504, according to an example embodiment. FIG. 5 may show a configuration of the first antenna, the second antenna, and the radome 504 for use in a system, such as that shown in FIG. 1. The first antenna (i.e., a top section 502A and a bottom section 502B) may correspond to the first antenna 102A of FIG. 1 and the second antenna (i.e., a top section 502C and a bottom section 502D) may correspond to the second antenna 102B of FIG. 1. Additionally, the radome 504 may correspond to the radome 104A of FIG. 1.

The first antenna may have a radome 504 that is mounted in a position where electromagnetic energy will pass through the radome 504 before being received by the first antenna. The second antenna may be configured to separately receive electromagnetic energy without the electromagnetic energy having passed through radome 504. As previously discussed, the radome 504 may be located and shaped in a receiving pathway of the first antenna way where all (or a majority of) incoming electromagnetic energy passes through the radome before being received by the first antenna. During operation, first antenna may be located within the center hollow portion of radome 504. The first antenna is driven by an antenna feed structure 506A. The antenna feed structure 506A may be configured to communicate the signals received by antenna 502A to a receiver front end via a coaxial cable or other conduit, such as the first receiver front end 108A. A similar feed structure 506B would exist for second antenna, connecting it to a second radio receiver via coaxial cable or other means.

In some examples, as shown in FIG. 5, the first antenna and the second antenna may be antennas with similar geometry, such as the bi-conical antennas shown in FIG. 5. Other example antenna geometries include patch antennas, dipole antennas, coaxial collinear antennas, monopole antennas, and any other antenna geometry. As previously discussed with respect to FIG. 1, depending on the direction-of-arrival application, different antenna designs may be used.

In one application, both the first antenna and the second antenna are bi-conical antennas because bi-conical antennas, like dipoles, have a generally toroidal omnidirectional radiation patterns and therefore may be used for omnidirectional detection across a wide range of elevation angles, with a nominal 3 dB beamwidth of +/−35 to +/−40 degrees about the horizon. As shown in FIG. 5, the first antenna and the second antenna may be configured to receive signals from the same plane. The arrangement of the first antenna and the second antenna may be known as bi-cone antenna. A bi-cone antenna has two antenna elements (i.e., a top section 502A and a bottom section 502B) oriented with the feeds at a very close location to one another, such as at the antenna feed structure 506A, with the upper and lower antenna elements pointed in different directions. The bi-cone antenna may enable the first antenna (i.e., a top section 502A and a bottom section 502B) and the second antenna (i.e., a top section 502C and a bottom section 502D) to be located very close to one another; for example, a phase center of each antenna may only be one quarter of a wavelength at the frequency of operation (or a frequency of operation in a given bandwidth) from one another.

In some other examples, the first antenna and the second antenna may each be different kinds of antennas. For example, the first antenna may be bi-conical antenna and the second antenna may be a simple monopole, other antenna element, or a more generic electromagnetic receiver.

Based on the desired use case, the frequencies over which the first antenna and the second antenna may vary. As one example, the first antenna and the second antenna may be configured to receive signals having frequencies between 8 GHz and 12 GHz. In other examples, different frequency bands may be used as well. The dimensions of the first antenna and the second antenna may be scaled, depending on a given frequency of operation.

In some examples, the direction-finding system 500 may include two radomes, radome 504 and a second radome (not shown in FIG. 5, but corresponding to second radome 104B of FIG. 1) that covers both the first antenna and the second antenna. In this example, the second radome may also be located in a receiving pathway of the first antenna and the second antenna way where all (or a majority of) incoming electromagnetic energy passes through the radome before being received by the first antenna and the second antenna. Additionally in this example, the second radome may be designed to not introduce any distortions (or introduce minimal distortion) in the incoming electromagnetic energy. Therefore, the second antenna may receive incoming electromagnetic energy that has passed through the second radome and the first antenna may receive incoming electromagnetic energy that has passed through the second radome and the radome 504.

As previously discussed, the radome 504 may introduce phase and/or amplitude distortions through various different structural and material properties of the radome, including having changes in the material of the radome that cause a permittivity of the radome that varies based on a position on the radome, the radome having a tapered width, and the radome having a printed pattern on the radome that causes an effective change in permittivity based on a position on the radome. In various other examples, the radome may introduce distortions based on other structural and material properties as well.

In still another example, the radome 504 may be attached to a motor, actuator, or other devices that causes a movement of the radome 504. The movement of the radome 504 may cause a time-varying change in the angular permittivity of the radome that aids in direction-of-arrival calculations. For example, a processor may know a speed at which the radome 504 is being rotated. By knowing the speed of the rotation of the radome, and a phase and/or amplitude difference between a signal received by the first antenna and a signal received by the second antenna, the processor may be able to determine an angle of arrival of the received electromagnetic signal.

Figure 6:
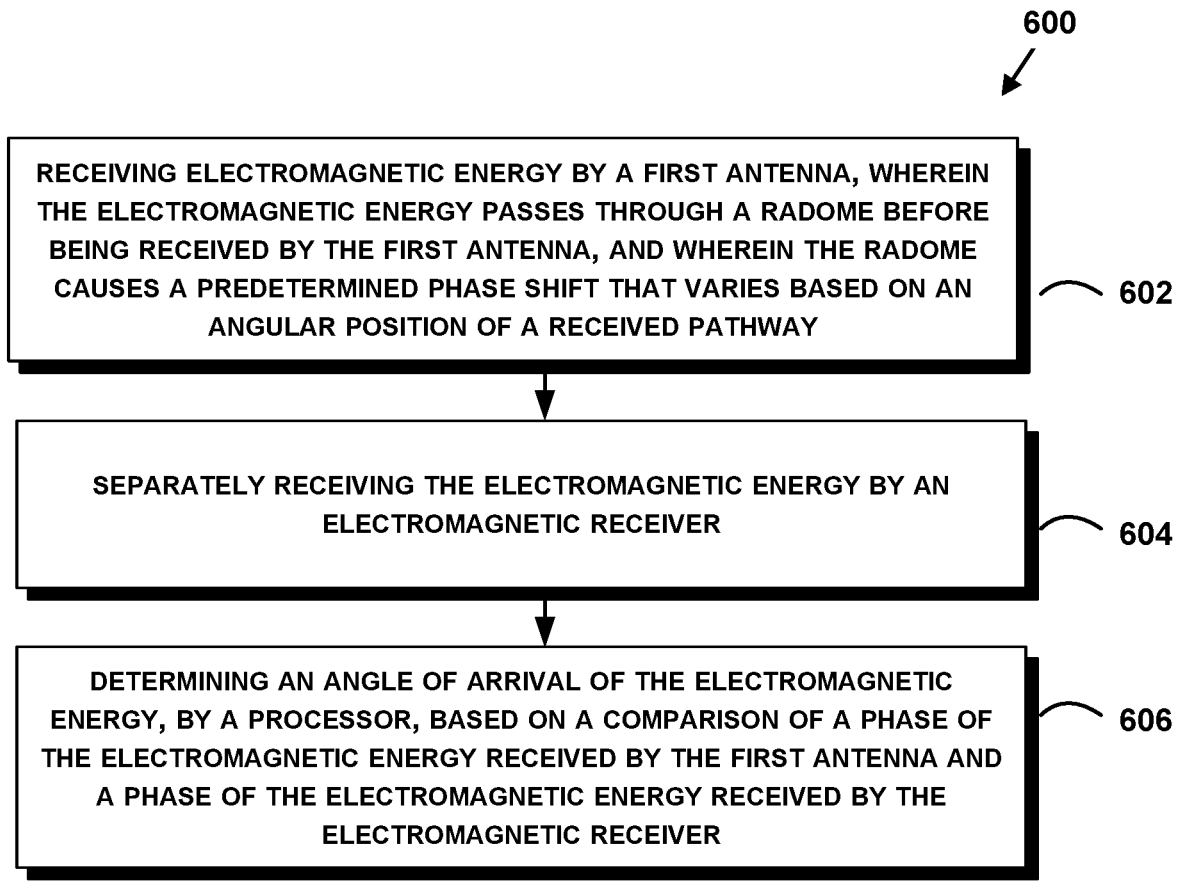
FIG. 6 shows a flowchart of an example method of operating a direction-of-arrival system, according to an example embodiment.

FIG. 6 shows a flowchart of an example method of operating a direction-of-arrival system, according to an example embodiment. Method 600 may be used with or implemented by the systems shown in FIGS. 1-5. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 600 may include one or more operations, functions, or actions as illustrated by one or more of blocks 602-606. Also, the various blocks may be combined into fewer blocks, divided into additional blocks, and/or removed based upon the desired implementation.

It should be understood that for this and other processes and methods disclosed herein, flowcharts show functionality and operation of one possible implementation of present embodiments. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

At block 602, the method 600 includes receiving electromagnetic energy by a first antenna, where the electromagnetic energy passes through a radome before being received by the first antenna, and where the radome causes a predetermined phase shift that varies based on an angular position of a received pathway. In some examples, the first antenna may be conical antenna configured to receive electromagnetic energy having a frequency between 8 gigahertz and 12 gigahertz from a given plane. In some additional examples, at block 702, the radome may also cause an amplitude shift, or both a phase and amplitude shift.

In some examples, at block 602, the radome may cause the phase shift or amplitude shift by the radome having a tapered width. In some other examples, at block 602, the radome may cause the phase shift or amplitude shift by using a permittivity of the radome that varies based on a position of the radome. In some additional examples, at block 602, the radome may cause the phase shift or amplitude shift by having a printed pattern on the radome or a plurality of segments that form the radome, where each segment has a respective permittivity. Additionally, block 602 may also include rotating the radome by using a motor.

At block 604, the method 600 includes separately receiving the electromagnetic energy by an electromagnetic receiver. In some examples, the electromagnetic receiver may be a second antenna. The second antenna may be conical antenna having the same geometry as the first antenna. At block 604, the electromagnetic receiver may be configured to receive electromagnetic energy having a frequency between 8 gigahertz and 12 gigahertz from the given plane. In some examples, at block 604, said receiving electromagnetic energy by a first antenna is at a location a distance equal to one-quarter of a wavelength of a frequency of operation from said receiving the electromagnetic energy by the second antenna.

At block 606, the method 600 includes determining an angle of arrival of the electromagnetic energy, by a processor, based on a comparison of a phase of the electromagnetic energy received by the first antenna and a phase of the electromagnetic energy received by the electromagnetic receiver. As previously discussed with respect to FIG. 1, the processor may receive data representative of the signals received by the first antenna and the radio receiver. The processor may use the data representative of the signals and stored data related to the radome to determine an angle from which the electromagnetic energy was received.

In some examples, the processor may determine a phase difference between the phase of the electromagnetic energy received by the first antenna and the phase of the electromagnetic energy received by the electromagnetic receiver to determine a phase offset. The phase offset may be based on an angle-dependent phase distortion introduced by the radome. The processor may include a lookup table of the angles of the radome and the associated phase distortions.

In some examples, the processor may determine an amplitude difference between the amplitude of the electromagnetic energy received by the first antenna and the amplitude of the electromagnetic energy received by the electromagnetic receiver to determine an amplitude offset. The amplitude offset may be based on an angle-dependent amplitude distortion introduced by the radome. The processor may include a lookup table of the angles of the radome and the associated amplitude distortions.

In some examples, the processor may perform Doppler frequency processing by determining frequency shifts to determine if the source of the received signal is moving and in what direction and speed.

Example methods and systems described can improve direction-finding system by reducing both the complexity and physical size of components used in a direction-finding system. The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may describe different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A direction-finding device comprising:
a first antenna configured to receive first electromagnetic energy;
a second antenna configured to receive second electromagnetic energy;
a radome positioned to cover and protect the first antenna such that the radome is located in a receiving pathway of the first antenna, wherein the radome is configured to cause a predetermined phase shift to the first electromagnetic energy received by the first antenna, wherein the predetermined phase shift varies based on an angular position of the receiving pathway of the first antenna, and wherein the radome is not located in a receiving pathway of the second antenna;
a motor coupled to the radome and configured to rotate the radome relative to the first antenna; and a radio receiver configured to receive the first electromagnetic energy from the first antenna and second electromagnetic energy from the second antenna, wherein the radome causes a phase of the first electromagnetic energy to differ from a phase of the second electromagnetic energy.

2. The direction-finding device of claim 1, further comprising a processor configured to determine an angle of arrival of the electromagnetic energy based on a comparison of the phase of the first electromagnetic energy received by the first antenna to the phase of the second electromagnetic energy received by the second antenna.

3. The direction-finding device of claim 1, wherein the first antenna and the second antenna have the same geometry.

4. The direction-finding device of claim 3, wherein the first antenna and the second antenna are bi-conical antennas.

5. The direction-finding device of claim 1, wherein a phase center of the first antenna is located a distance approximately equal to one-quarter of a wavelength of a frequency of operation from a phase center of the second antenna.

6. The direction-finding device of claim 1, wherein the radome has a tapered wall thickness.

7. The direction-finding device of claim 1, wherein the radome has a permittivity that varies based on a position on the radome.

8. The direction-finding device of claim 1, wherein the permittivity is based on one of a printed pattern on the radome or a plurality of segments forming the radome, and wherein each segment has a respective permittivity.

9. The direction-finding device of claim 1, wherein the first electromagnetic energy and the second electromagnetic energy have a frequency between 8 gigahertz and 12 gigahertz.

10. A method comprising:
receiving first electromagnetic energy by a first antenna, wherein the first electromagnetic energy passes through a radome before being received by the first antenna, and wherein the radome is positioned to cover and protect the first antenna, and wherein the radome causes a predetermined phase shift to the first electromagnetic energy received by the first antenna, wherein the predetermined phase shift varies based on an angular position of a received pathway of the first antenna; and
separately receiving second electromagnetic energy by a second antenna, wherein the radome is not located in a receiving pathway of the second antenna;
wherein the radome is coupled to a motor configured to rotate the radome relative to the first antenna, and wherein the radome causes a phase of the first electromagnetic energy to differ from a phase of the second electromagnetic energy.

11. The method of claim 10, further comprising determining an angle of arrival of the first electromagnetic energy, by a processor, based on a comparison of the phase of the first electromagnetic energy received by the first antenna and the phase of the second electromagnetic energy received by the second antenna.

12. The method of claim 10, wherein the first antenna and the second antenna have the same geometry.

13. The method of claim 11, wherein said receiving the first electromagnetic energy by the first antenna is at a location at a distance equal to one-quarter of a wavelength of a frequency of operation from said receiving the second electromagnetic energy by the second antenna.

14. The method of claim 10, further comprising causing the phase shift by using a tapered wall thickness of the radome.

15. The method of claim 10, further comprising causing the phase shift by using a permittivity of the radome that varies based on a position of the radome.

16. The method of claim 10, further comprising providing one of a printed pattern on the radome or a plurality of segments forming the radome, wherein each segment has a respective permittivity.

17. The method of claim 10, further comprising rotating the radome by using the motor.

18. The method of claim 10, wherein the received first electromagnetic energy and the received second electromagnetic energy have a frequency between 8 gigahertz and 12 gigahertz.

19. A direction-finding device comprising:
a first bi-conical antenna configured to receive first electromagnetic energy;
a second bi-conical antenna configured to separately receive second electromagnetic energy, wherein:
the second bi-conical antenna has the same geometry as the first bi-conical antenna;
a phase center of the first bi-conical antenna is located one-quarter of a wavelength of a frequency of operation from a phase center of the second bi-conical antenna; and
a radome positioned to cover and protect the first bi-conical antenna such that the radome is located in a receiving pathway of the first bi-conical antenna, wherein the radome is configured to cause a predetermined phase shift to the first electromagnetic energy received by the first bi-conical antenna, wherein the predetermined phase shift varies based on an angular position of the receiving pathway of the first bi-conical antenna, and wherein the radome is not located in a receiving pathway of the second bi-conical antenna;
a motor coupled to the radome and configured to rotate the radome relative to the first bi-conical antenna; and
a processor configured to determine an angle of arrival of the first electromagnetic energy based on a comparison of a phase of the first electromagnetic energy received by the first bi-conical antenna and a phase of the second electromagnetic energy received by the second bi-conical antenna.

20. The direction-finding device of claim 1, further comprising:
a processor configured to provide a signal to the motor, wherein the motor is configured to rotate the radome based on receiving the signal from the processor.

* * * * *